US 6,799,889 B2

(12) United States Patent
Pennock (10) Patent No.: US 6,799,889 B2
(45) Date of Patent: Oct. 5, 2004

(54) TEMPERATURE SENSING APPARATUS AND METHODS

(75) Inventor: John L. Pennock, Midlothian (GB)

(73) Assignee: Wolfson Microelectronics, Ltd., Edinburgh (GB)

(*) Notice: Subject to any disclaimer, the term of this patent is extended or adjusted under 35 U.S.C. 154(b) by 0 days.

(21) Appl. No.: 10/265,414

(22) Filed: Oct. 7, 2002

(65) Prior Publication Data

US 2004/0062292 A1 Apr. 1, 2004

(30) Foreign Application Priority Data

Oct. 1, 2002 (GB) .............................................. 0222727

(51) Int. Cl.[7] .............................. G01K 7/01; G05F 3/26
(52) U.S. Cl. ...................... 374/178; 374/183; 327/513; 327/538; 323/312; 323/315
(58) Field of Search ................................ 374/178, 183, 374/170; 327/512, 513, 538; 323/312, 315, 907

(56) References Cited

U.S. PATENT DOCUMENTS

| | | | |
|---|---|---|---|
| 3,959,713 A | | 5/1976 | Davis et al. |
| 4,574,205 A | | 3/1986 | Nagano |
| 4,692,688 A | | 9/1987 | Stanojevic |
| 4,789,819 A | | 12/1988 | Nelson |
| 5,095,227 A | | 3/1992 | Jeong |
| 5,099,381 A | | 3/1992 | Wilcox |
| 5,149,199 A | | 9/1992 | Kinoshita et al. |
| 5,327,028 A | | 7/1994 | Yum et al. |
| 5,336,943 A | * | 8/1994 | Kelly et al. .................. 327/513 |
| 5,394,078 A | * | 2/1995 | Brokaw ....................... 323/907 |
| 5,430,367 A | * | 7/1995 | Whitlock et al. ........... 323/907 |
| 5,977,813 A | * | 11/1999 | Boerstler ..................... 327/512 |
| 5,980,106 A | | 11/1999 | Yamamoto et al. |
| 6,084,462 A | * | 7/2000 | Barker ........................ 327/512 |
| 6,181,121 B1 | | 1/2001 | Kirkland et al. |
| 6,188,270 B1 | | 2/2001 | Boerstler |
| 6,366,071 B1 | | 4/2002 | Yu |
| 6,489,831 B1 | * | 12/2002 | Matranga et al. ........... 327/512 |
| 2002/0093325 A1 | | 7/2002 | Ju |
| 2003/0141920 A1 | * | 7/2003 | Schrodinger et al. ....... 327/512 |

FOREIGN PATENT DOCUMENTS

WO    WO 9908082 A1 *  2/1999   ............ G01K/7/00

OTHER PUBLICATIONS

Bakker, A., "CMOS smart temperature sensors—an overview," Sensors, 2002. Proceedings of IEEE, vol. 2, pp. 1423–1427, 2002.*

Riedijk, F.R.; Huijsing, J.H., "An integrated absolute temperature sensor with digital output," Solid–State Sensors and Actuators, 1991. Digest of Technical Papers, Transducers'91.,Jun. 24–27, 1991, pp. 479–482.*

Anton Bakker, et al., "Micropower CMOS Temperature Sensor with Digital Output", IEEE Journal of Solid State Circuits, vol. 31, No. 7, Jul. 1996, pp. 933–937.

* cited by examiner

Primary Examiner—Diego Gutierrez
Assistant Examiner—Stanley J. Pruchnic, Jr.
(74) Attorney, Agent, or Firm—Dickstein Shapiro Morin & Oshinsky LLP (57) ABSTRACT

Circuits and methods for generating a temperature dependent signal are described involving: generating a thermal voltage referenced positive temperature coefficient signal using a pair of transistors operating at different current densities; generating a transistor voltage referenced negative temperature coefficient signal using a transistor voltage of one of said pair of transistors; and subtracting one of said positive and negative temperature coefficient signals from the other of said signals to generate said temperature dependent signal, whereby the temperature dependence of said temperature dependent signal is greater than either of said subtracted signals.

45 Claims, 8 Drawing Sheets

TEMPERATURE SENSING APPARATUS AND METHODS

FIELD OF THE INVENTION

This invention relates to temperature sensing apparatus, and in particular to circuits and methods for temperature sensing.

BACKGROUND TO THE INVENTION

For high power circuits such as power amplifiers for audio speakers and linear power supply regulators, there is a possibility of fault conditions such as external short circuits causing high on-chip currents. The on-chip power dissipation caused by these currents can result in excessive temperatures which can degrade the characteristics of circuits on the silicon chip and, in extreme cases, may even constitute a fire hazard. For this reason such power circuits are often provided with a thermal shutdown function where power outputs are disabled if the chip temperature exceeds a predetermined limit, for example 150° C. To implement such a function an on-chip circuit is needed to detect and flag when such a predetermined temperature threshold is exceeded. There is also a need for a temperature detector in some microprocessor systems, for example where the microprocessor is clocked at a high speed. In such a system if a temperature limit is reached the clock may be slowed down to reduce the supply current drawn by the microprocessor and/or an output signal may be provided to turn on a fan.

In the early days a Zener diode voltage would be resistively divided and applied to the base of a common-emitter bipolar transistor. The base-emitter voltage ($V_{be}$) to turn on a bipolar transistor decreases by approximately 2 mV per ° C. so that as the temperature increased with a constant voltage applied (or even a rising voltage if the Zener had a positive temperature coefficient or tempco) a temperature would be reached where the bipolar transistor turned on and its collector current could then be used as an output.

As supply voltages have reduced this method has become impracticable as typical Zener voltages, which are difficult to achieve reliably below 5 to 7V, are too large. Instead it has become conventional to use a bandgap voltage instead of a Zener voltage, as described for example in U.S. Pat. No. 3,959,713, U.S. Pat. No. 4,692,688, U.S. Pat. No. 4,574,205 and U.S. Pat. No. 5,099,381. For example U.S. Pat. No. '381 describes a circuit where a bandgap voltage from a Brokaw cell is compared to a $V_{be}$ multiplier voltage. To avoid electrically and/or thermally induced instability about the threshold temperature some local positive feedback may also be applied to provide the switching point with some hysteresis. A temperature detection circuit employing a bandgap voltage source and feedback to provide hysteresis is described in U.S. Pat. No. 5,149,199. General background prior art in the field of temperature detection can be found in U.S. Pat. No. 6,181,121, US 2002/0093325, U.S. Pat. No. 6,188,270, U.S. Pat. No. 6,366,071, U.S. Pat. No. 5,327,028, U.S. Pat. No. 4,789,819 and U.S. Pat. No. 5,095,227.

The IEEE Journal of Solid-State Circuits, vol. 31, no. 7, July 1996, pages 933 to 937, "Micropower CMOS Temperature Sensor with Digital Output", A Bakker and J H Huijsing, describes a CMOS temperature sensor in which a current proportional to a $V_{be}$ voltage is compared to a reference current which is substantially independent of temperature formed by the addition of the PTAT (proportional to absolute temperature) current to a base-emitter voltage referenced current. The sum of these two currents is approximately temperature independent because they have opposite temperature coefficients, positive for the PTAT current and negative for the $V_{be}$ current. However the circuit of Bakker and Huijsing is relatively complicated (see, for example, FIG. 4) and its sensitivity could be improved.

Figure 1A:
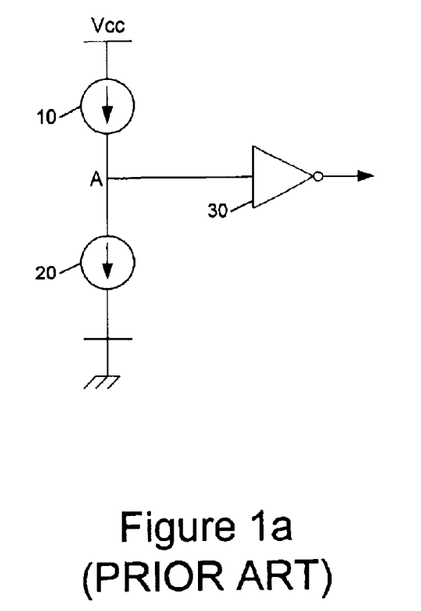
FIGS. 1A and 1B show, respectively, a current source-based temperature detection circuit, and thermal characteristics of current sources in the circuit of FIG. 1A.
Figure 1B:
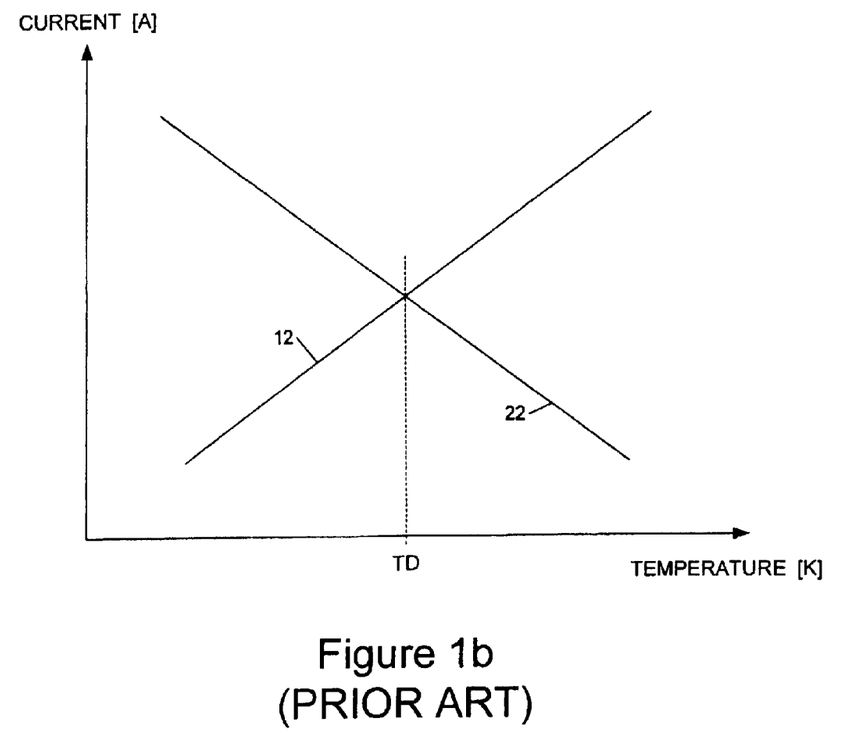

Another temperature detection circuit is described in U.S. Pat. No. 5,980,106, which again uses a bandgap reference. FIGS. 1A and 1B, which are taken from U.S. Pat. No. '106 illustrate the principle of this circuit. Broadly speaking two current sources 10, 20 with respective positive and negative temperature coefficient characteristics 12, 22 are applied to a detection node A coupled to an output circuit, in FIG. 1A inverter 30. As can be seen from inspection of FIGS. 1A and 1B the inverter output will switch where the voltage of point A crosses the switching threshold for the inverter, in FIG. 1B at threshold temperature TD. U.S. Pat. No. '106 also teaches the application of feedback to detection node A as shown, for example, in FIG. 3A of '106. A detailed temperature detection circuit (FIG. 4) is also described in which a thermal voltage (VT)-based current Ith is combined (compared) with a current derived from a bandgap reference Ibg at node A (negative temperature coefficients introduced by resistors in the circuit cancelling). Again, however, the circuit of U.S. Pat. No. '106 is relatively complex and includes floating bipolar transistors as well as MOSFETs.

It is desirable to be able to provide a simpler, cheaper and easier to fabricate temperature sensor. A bandgap voltage is often present in circuits such as voltage regulators but is unnecessary in applications such as speaker amplifiers, so that an arrangement not reliant on an explicit bandgap voltage generator would be preferable. Furthermore, it has been recognized that fundamentally it should be possible to construct a temperature detector merely by comparing two quantities with different temperature coefficients and predictable absolute values, or at least with predictable relative values at some reference temperature from which temperature coefficients may be referred. Also, increasingly circuits are being manufactured using CMOS rather than bipolar technology, even in traditionally bipolar areas such as loudspeaker power amplifiers (see, for example, the Fairchild FAN 7021). The use of CMOS precludes the application of many prior art techniques.

SUMMARY OF THE INVENTION

According to a first aspect of the present invention there is therefore provided a temperature sensor comprising: a current mirror with an input and at least two outputs; a first reference current generator having a first current input and a first current output and configured to generate a first reference current with a positive temperature coefficient at said first current output in response to said first current input; a second reference current generator having a second current input and a second current output and configured to generate a second reference current with a negative temperature coefficient at said second current output in response to said second current input; and wherein one of said first and second reference generators has a respective current output coupled to said input of said current mirror; said first current input of said first reference generator and said second current input of said second reference generator share an input node coupled to a first of said current mirror outputs; and the other of said first and second reference generators has a respective current output coupled to a second of said current mirror outputs to thereby provide a current sense node; and wherein said first reference current generator comprises a thermal voltage referenced current source, and said second reference current generator comprises a temperature dependent semiconductor characteristic referenced current source.

In this specification the term current source includes negative current sources, that is sources in which a current flows into the source (sometimes alternatively referred to as "sinks"), and current may therefore flow into a current source output. Broadly speaking, two reference current sources are provided, both interacting with the same current mirror, one of the current sources being referred or substantially proportional to a bipolar transistor base-emitter voltage (negative temperature coefficient), the other of the current sources being referred or substantially proportional to a bipolar transistor thermal voltage (in mathematical terms kT/q where k is Boltzman's constant, T is the absolute temperature in Kelvin and q is the charge on an electron). Such a thermal voltage referenced source is sometimes referred to as a PTAT (proportional to absolute temperature) source although in practice if the output is extrapolated back to absolute zero there may be an offset.

This arrangement provides a particularly simple and elegant temperature sensing circuit with performance parameters which are relatively straightforward to determine and which can be made relatively consistent in practice. In a preferred embodiment the thermal voltage referenced source comprises a pair of bipolar transistors and one of these transistors also provides a base-emitter voltage to which the second current source can be referenced, providing a further simplification and locking the parameters of the two current sources together more closely.

The temperature sensing circuit is suited to fabrication in MOS, particularly CMOS technology and in this case the circuit is such that the bipolar transistors employed in the current sources may comprise parasitic (vertical or lateral) devices inherent in CMOS technology, typically vertical PNP transistors in P-substrate CMOS and vertical NPN transistors in N-substrate CMOS. The circuit may also be fabricated in BiCMOS.

In other embodiments the first (positive temperature coefficient) source may employ MOS rather than bipolar transistors for example using a $\Delta$Vgs rather than a $\Delta$Vbe-type arrangement, and the second (negative temperature coefficient) source may then comprise a MOS $V_T$-referenced or low-current Vgs-referenced source.

In preferred embodiments the temperature sensor includes a positive feedback and this may be advantageously applied by injecting current into the shared input node. This positive feedback will tend to result in a switching-type behaviour at the current sense node output, so that as the output begins to change the positive feedback encourages this change. The positive feedback also provides hysteresis about a threshold switching temperature. In one embodiment the feedback may be provided by a form of differential amplifier or differential or long-tailed pair in which one of the transistors of the pair has an input from the current sense node and the other has an input connected to a suitable bias voltage. Preferably the sensor also includes an output circuit to provide an essentially binary output depending upon whether or not the temperature of the circuit (more particularly, of the bipolar transistors) is above or below the threshold, taking into account hysteresis.

In a related aspect the invention provides a method of providing a temperature dependent signal, the method using: a current mirror with an input and at least two outputs; a first reference current generator having a first current input and a first current output; a second reference current generator having a second current input and a second current output; and wherein one of said first and second reference generators has a respective current output coupled to said input of said current mirror; said first current input of said first reference generator and said second current input of said second reference generator share an input node coupled to a first of said current mirror outputs; and the other of said first and second reference generators has a respective current output coupled to a second of said current mirror outputs to thereby provide a current sense node; the method comprising generating, using said first current generator, a first, transistor thermal voltage referenced current with a positive temperature coefficient at said first current output in response to a signal from said current mirror at said shared input node; generating, using said second current generator, a second transistor voltage referenced current with a negative temperature coefficient at said second current output in response to said signal from said current mirror at said shared input node; and combining signals dependent upon said first and second reference currents at said sense node to provide said temperature dependent signal.

It will be appreciated that the combining of the signals may comprise either a comparison of the signals to one another or a subtraction of the signals from one another. The temperature dependent output signal (at the sense node) may comprise either a current or a voltage signal.

In another aspect the invention provides a temperature detection circuit comprising: a current mirror having an input and first and second mirrored current outputs, said input and said first mirrored output being coupled via respective first and second MOS transistor channels to respective first and second transistors to set a ratio of current densities in said first and second transistors to provide a positive temperature coefficient current from said second mirrored current output; a third MOS transistor having a gate connection coupled to a gate connection of said first MOS transistor and a pair of channel connections, one of said channel connections being coupled via a resistor to a common connection of said first and second transistors to provide a negative temperature coefficient current output at said other channel connection whereby said current output is referenced to a temperature-dependent voltage of said first transistor, said other channel connection being coupled to said second mirrored current output to provide a temperature dependent output.

In a related aspect the invention provides a temperature detection circuit comprising: a current mirror having an input and first and second mirrored current outputs, said second and first mirrored outputs being coupled via respective first and second MOS transistor channels to respective first and second transistors; a third MOS transistor having a gate connection coupled to a gate connection of said first MOS transistor and a pair of channel connections, one of said channel connections being coupled via a resistor to a common connection of said first and second transistors to provide a negative temperature coefficient current output at said other channel connection whereby said current output is referenced to a temperature-dependent voltage of said first transistor, said other channel connection being coupled to said current mirror input to provide negative temperature coefficient current from said second mirrored current output; and wherein a ratio of current densities in said first and second transistors determines a positive temperature coefficient current which is combined with said current from said second mirrored current output to provide a temperature dependent output.

In a one embodiment the positive temperature coefficient current is a current flowing in the first MOS transistor channel.

In the specific embodiments described later the first and second transistors are bipolar transistors, the first MOS transistor has its drain and gate connected together and the second MOS transistor has a resistor connected between its source and the second bipolar transistor. Each bipolar transistor, which may be parasitic in CMOS technology, has its base and collector connected together. A feedback circuit is preferably employed so that the temperature dependent output exhibits roughly bistable behaviour either side of a threshold temperature, with some hysteresis. Means may also be included to adjust the threshold temperature, for example by effectively adjusting said resistor (used to convert the first bipolar transistor base-emitter voltage to a current) and/or by effectively injecting current into or drawing current from said temperature dependent output.

In a further aspect the invention also provides a method of generating a temperature dependent signal, the method comprising: generating a thermal voltage referenced positive temperature coefficient signal using a pair of transistors operating at different current densities; generating a transistor voltage referenced negative temperature coefficient signal using the a transistor voltage of one of said pair of transistors; and subtracting one of said positive and negative temperature coefficient signals from the other of said signals to generate said temperature dependent signal, whereby the temperature dependence of said temperature dependent signal is greater than either of said subtracted signals.

Preferably the transistors are bipolar transistors and the transistor voltage is a base-emitter voltage. The use of thermal voltage-referenced and base-emitter voltage-referenced signals, preferably current signals, rather than a bandgap reference enables the same transistor to be used for both $V_{be}$ and PTAT current generation. Furthermore by subtracting the positive and negative temperature coefficient signals from one another the effective temperature coefficient is increased and the temperature dependence of the temperature dependent signal is therefore enhanced. Preferably the subtracting comprises applying the positive and negative temperature coefficient signals to a detection node. A positive feedback may also be applied, preferably to the shared bipolar transistor, that is to the transistor used for generating both the positive and negative temperature coefficient signals.

In a related aspect the invention also provides a circuit for generating a temperature dependent signal, the circuit comprising: means for generating a thermal voltage referenced positive temperature coefficient signal using a pair of transistors operating at different current densities; means for generating a transistor voltage referenced negative temperature coefficient signal using a transistor voltage of one of said pair of transistors; and means for subtracting one of said positive and negative temperature coefficient signals from the other of said signals to generate said temperature dependent signal, whereby the temperature dependence of said temperature dependent signal is greater than either of said subtracted signals.

BRIEF DESCRIPTION OF THE DRAWINGS

These and other aspects of the invention will now be further described, by way of example only, with reference to the accompanying figures in which.

DETAILED DESCRIPTION OF THE PREFERRED EMBODIMENTS

Figure 2A:
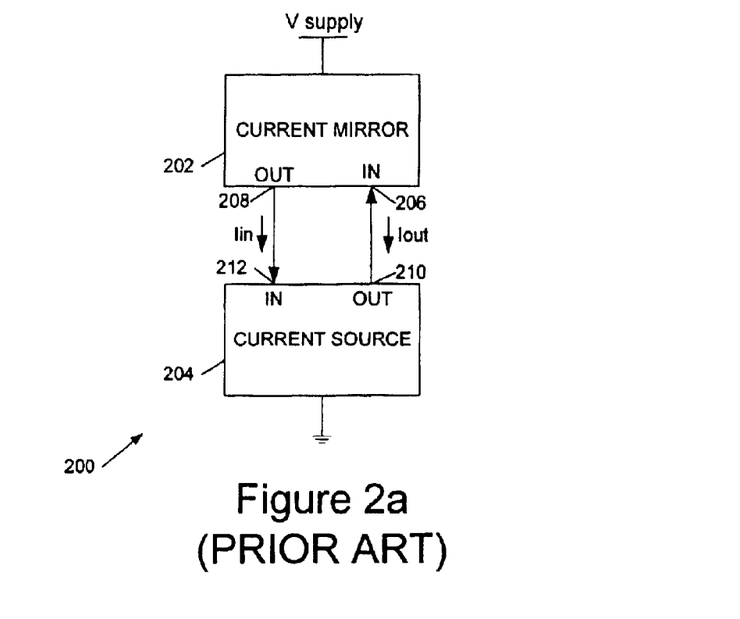
FIGS. 2A to 2C show, respectively, a self-biased reference current source, a $V_{be}$-referenced current source, and a thermal voltage-referenced current source.

Referring to FIG. 2A, this shows a so-called self-biased reference 200 comprising a current mirror 202 and a current source 204. An input 206 to the current mirror sets a current at output 208 of the current mirror and the current source 204 provides an output current at output 210 which is dependent upon a current into input 212. The output 210 may source or sink current, and in the illustrated example sinks current. Generally the output of the current source will be approximately constant over a range of input currents but will reduce at small input currents.

The reference source 200 employs a so-called bootstrap bias technique in which the current source output is connected to the current mirror input, and vice versa. The circuit has a stable operating point where (for a 1:1 current mirror) $I_{out}=I_{in}$, that is where the input current to the current source is equal to the output current of the current source. This reduces supply voltage dependence of the output current.

Figure 2B:
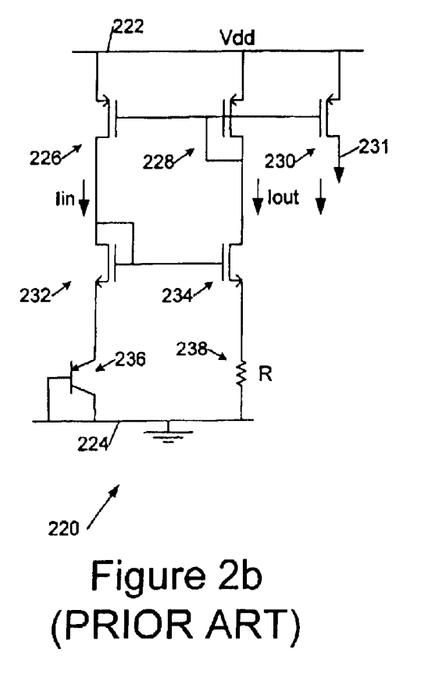

FIGS. 2B and 2C show applications of the basic technique of FIG. 2A. FIG. 2B shows a bipolar transistor base-emitter voltage referenced current source using CMOS technology as described, for example, in "Analysis and Design of Analogue Integrated Circuits", P R Gray, P J Hurst, S H Lewis and R G Meyer, John Wylie, 4/E 2001, Chapter 4, section 4.4.2.

The base-emitter referenced current source 220 of FIG. 2B is supplied by positive supply Vdd and ground lines 222, 224. Transistors 226 and 228 comprise a current mirror equivalent to current mirror 202 of FIG. 2A, transistor 228 providing the input and transistors 226 providing the outputs. Transistors 232, 234 and 236 and resistor 238 comprise a current source equivalent to current source 204, transistors 232 and 234 being arranged to apply a base-emitter voltage of transistor 236 (in effect a diode junction voltage) across resistor 238 so that $I_{out}=V_{be}/R_{238}$ (because transistors 232 and 234 carry the same current and, if matched, have the same gate source voltage). Transistor 230 simply provides an additional output from the current mirror to provide a current output equal to $I_{out}$ on line 231.

Figure 2C:
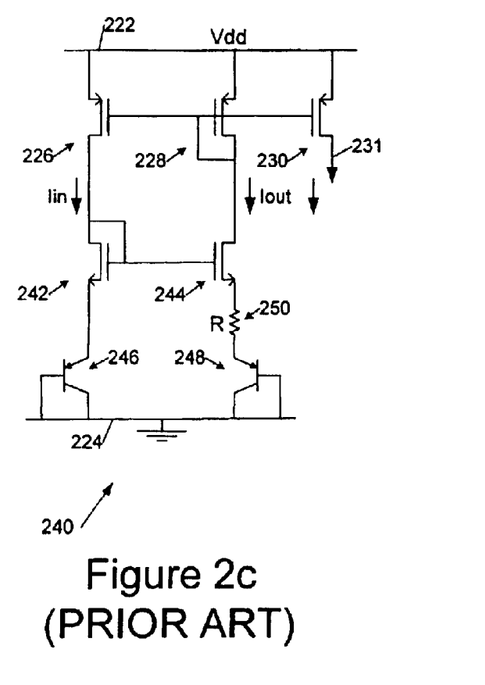

FIG. 2C shows a thermal voltage ($V_T$) referenced current source 240. The circuit of FIG. 2C is similar to that of FIG. 2B and like elements are indicated by like reference numerals. In particular a current mirror comprising transistors 226, 228 and 230 is again provided but a different, thermal voltage-referenced current source is employed. This current source comprises transistors 242, 244, 246, 248 and resistor R 250. Bipolar transistors 246, 248 are operated at different current densities, for example by providing them with different emitter areas, but they carry equal currents so that (by the Ebers-Moll equation) the difference in their $V_{be}$'s is equal to $(KT/q)\ln(J1/J2)=V_T \ln(J1/J2)$ where $V_T=kT/q$ is the so-called thermal voltage (k, T and q defined as above), ln denotes log to base e and J1 and J2 are the (emitter) current densities of transistors QP1 and QP2 respectively. At room temperature (27° C.), $V_T \approx 25.9$ mV, at 150 deg C.

$V_T$=36.5 mV). Thus in source 240 the output current Iout= $V_T/R_{250}\ln(J1/J2)$, which is approximately proportional to absolute temperature. (In the following we assume for simplicity that all resistors have zero temperature coefficients. In practice in an integrated circuit they may have temperature coefficients of up to about 2000 ppm/deg C., but provided that all resistors are made from the same material, their temperature coefficients will all track and the consequent effects will cancel, at least to first order.)

Figure 3A:
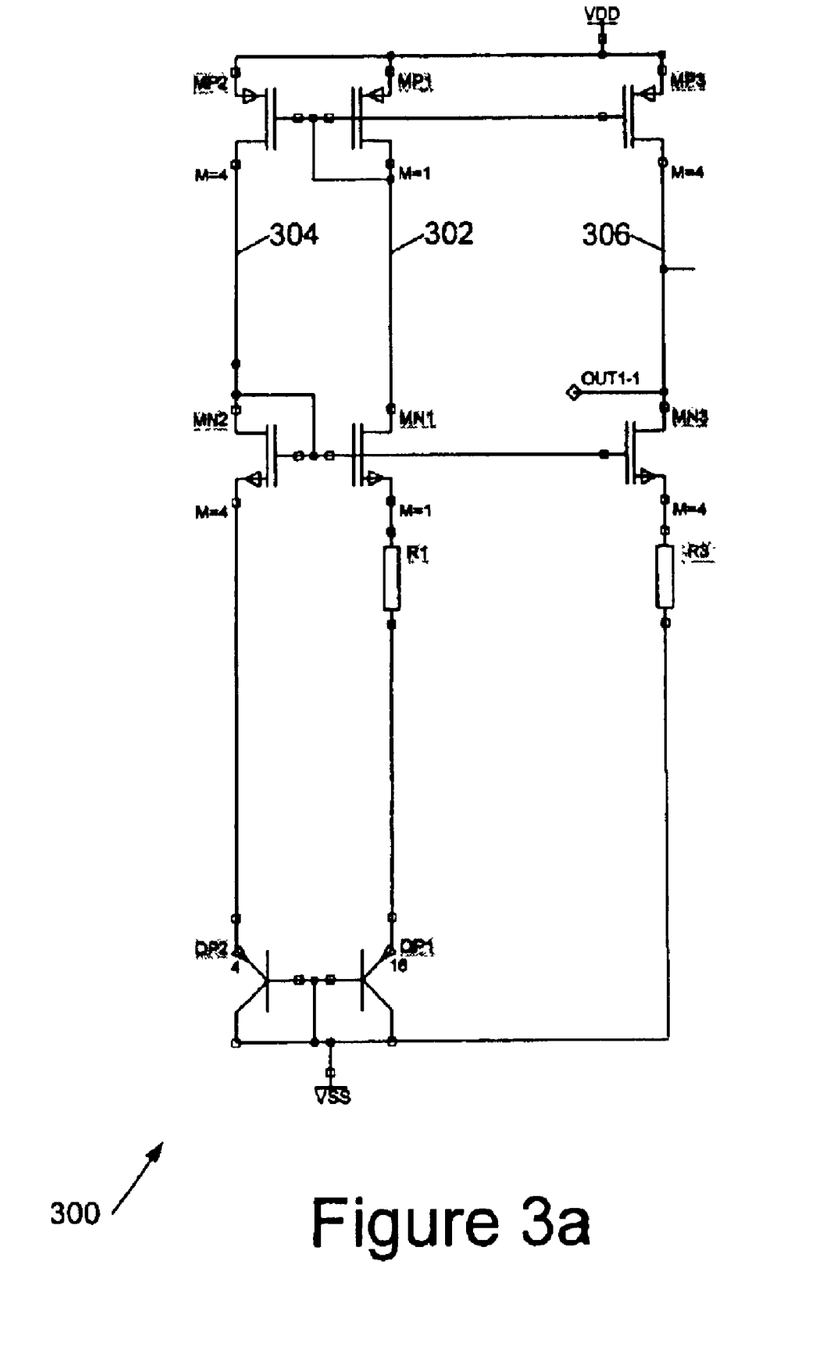
FIGS. 3A to 3D show respectively a first and second embodiments of a temperature detector circuit without hysteresis according to the present invention, and first and second embodiments of a temperature detector circuit with hysteresis according to the present invention.

Referring now to FIG. 3A, this shows a first embodiment of a temperature detector circuit 300 according to the present invention. This circuit builds upon the basic principles described above.

Referring to FIG. 3A, broadly speaking MP1, 2, 3, MN 1 and 2, QP1 and 2 and R1 comprise a thermal voltage referenced current source similar to that shown in FIG. 2C. In more detail MOS transistors MP1 and MP2 form a current mirror with an input 302 and an output 304, broadly corresponding to current mirror 202 of FIG. 2A.

MOS transistors MN1 and MN2, bipolar transistors QP1 and QP2 and resistor R1 comprise a $V_T$-referenced current source with, in effect, an output on line 302 and an input on line 304, thus broadly corresponding to current source 204 of FIG. 2A. MOS transistor MP3 provides an additional output from the current mirror on line 306.

MOS transistors MN2 and MN3, bipolar transistor QP2 and resistor R3 together comprise a $V_{be}$-referenced current source referenced to the base-emitter voltage of PNP bipolar transistor QP2. Line 306 effectively also carries an output from this current source. It will be appreciated that this base-emitter referenced source has a different configuration to that shown in FIG. 2B since it is servoed to the output 304 of the current mirror driven by the thermal voltage referenced current source rather than by its own current mirror. It will also be recognized that in the arrangement of FIG. 3A MOS transistor MN2 and bipolar transistor QP2 are common to both the thermal voltage referenced and $V_{be}$ referenced current sources.

In FIG. 3A relative sizes of the MOS transistors are denoted by values of a variable M and it can be seen that current mirror transistors MP1, MP2 and MP3 are in a size ratio MP1:MP2:MP3=1:4:4, to form a 4:1 current mirror so that the current through MP1 is ¼ of the current through MP2 (and ¼ of the current through MP3). MOS transistors MN1, MN2 and MN3 are in the same ratio, that is MN1:MN2:MN3=1:4:4. The bipolar transistors QP1 and QP2, both of which have their base and collector terminals joined, are in a size ratio QP1:QP2=4:1, that is the emitter area of transistor QP2 is designed to be ¼ that of transistor QP1.

The operation of the circuit of FIG. 3A will next be described.

Assume that initially line 306 (that is terminal "OUT1") is connected externally to a voltage source which is high enough to keep MOS transistor MN3 in its saturation (constant-current) region and low enough to keep transistor MP3 in its saturation or substantially constant-current region. Assume also that all the other MOS transistors are also in saturation and carrying current.

As previously mentioned transistors MP1 and MP2 comprise a 4:1 current mirror so that the current through MP2 is four times the current through MP1. These currents flow through transistors MN1 and MN2 respectively and thence through bipolar transistors QP1 and QP2 respectively. Since the current through transistor QP2 is four times that through transistor QP1 and since transistor QP2 has one ¼ of the emitter area of transistor QP1, transistor QP2 operates at sixteen times the current density of transistor QP1. As previously, a pair of bipolar transistors with current densities in the ratio J1/J2 will have a $V_{be}$ difference of $(kT/q)\ln(J1/J2)$, in this case 25.9 mV×ln(16), that is approximately 72 mV at T=27° C., or 35.6 mV×ln(16) approximately 101 mV at 150 deg C.

Now consider MOS transistors MN1 and MN2. Transistor MN2 carries four times the current of transistor MN1 and has four times the size so that the gate-source voltage $V_{gs}$ of MN1 will be substantially the same as the gate source voltage of transistor MN2. Since the gate of transistor MN1 is connected to the gate of transistor MN2 the source of transistor MN1 will be at the same voltage as the source of transistor MN2, that is at the base-emitter voltage of bipolar transistor QP2. This voltage is applied to the upper end of resistor R1 whilst the lower end of resistor R1 is at the base-emitter voltage of bipolar transistor QP1. Thus the voltage across R1 is equal to the difference in $V_{be}$'s $\Delta V_{be}$= 101 mV and a current flows through R1 and hence in line 302 of 101 mV/R1. This current is then mirrored with a 4:1 ratio by transistor MP3 giving a current into line 306, that is into or through node "OUT1" equal to 404 mV/R1 at 150 deg C., with a positive temperature coefficient. This current is in fact a PTAT current since it is proportional to the thermal voltage $V_T$=kT/q.

Now consider the $V_{be}$-referenced current source. As previously mentioned the voltage at the source of transistor MN2 is the base-emitter voltage of bipolar transistor QP2 and, again as previously mentioned, transistor MN3 is chosen to be the same size as transistor MN2. Assuming for now that MN2 and MN3 have similar gate-source voltages, then the voltage at the source of transistor MN3 will also be approximately equal to the base-emitter voltage of bipolar transistor QP2. Thus the current through R3, and hence through MN3 to node "OUT1", will be approximately (QP2 $V_{be}$)/R3.

Furthermore, since $V_{be}$ has a negative temperature coefficient, typically −2 mV per ° C. or, equivalently, −3000 ppm per ° C., so will the current through MN3 to node "OUT1".

In the illustrated circuit R1 was chosen to be 44 kΩ to set the current through MP3, I(MP3)=404 mV/44 kohm=9.20 uA and the current through QP2, I(QP2)=9.20 uA/4=2.30 uA. In one manufacturing process this gave Vbe(QP2)=462 mV, and so R3 was set at 462 mV/9.20 uA=50.2 kΩ so that at 150 deg C., I(MN3)=I(MP3).

If the temperature then rises above 150 deg C. the current through transistor MP1, and hence that through MP3 increases and the current through transistor MN3 decreases, resulting in a current out of node OUT1 into the external voltage source. If there is a fall in temperature below 150 deg C. the current through transistor MP1 decreases and hence so does that through MP3, and the current through transistor MN3 increases, giving a current into node OUT1 from the voltage source. If the voltage source is disconnected from node OUT1 the voltage level of this node will rise or fall respectively, eventually taking MP3 or MN3 respectively out of saturation to balance the currents. It can be seen that node OUT1 roughly corresponds to node A in the basic arrangement of FIG. 1A.

The choice of transistor sizes may be varied depending upon the requirements of any particular application. For an integrated circuit implementation, the main concerns include the chip area occupied by the components, and minimising the effect of mismatch between nominally identical devices.

Typically, the random offset voltages between the bipolar devices and between resistors will be less than the offset voltages between MOS transistors in the circuit, and the manufacturing spread will be dominated by mismatch between MN2 and MN1, since this error is essentially superimposed on the small quiescent voltage across R1.

Consider first the choice of ratio of MN2 and MN1. A circuit as described above, but with unity ratio between MN2 and MN1 and between MP2 and MN1 would still work, with appropriate adjustment of R1. However then the current density ratio between QP1 and QP2 would only be 4 not 16, so this would then only give half the voltage ((kT/q)ln4 not (kT/q)ln16) across R1, making the circuit more sensitive to mismatch between MN2 and MN1. To recover the current density ratio, QP1 could be made 16 times QP2, but this would occupy a lot of silicon area. On the other hand, if the ratios of MN2 to MN1 and MP2 to MP1 were say 8:1, not 4:1 then this would only increase the voltage across R1 by a factor ln32/ln16=1.25, but the MOS transistors, already large to reduce the manufacturing tolerances, would be double the area. For the technology considered, 4:1 was chosen, but the optimum will depend on the constraints of the particular manufacturing technology.

Consider now the ratio of MN3 to MN1. As noted above, at 150 deg C., the voltage across R1 will be about 100 mV, and that across R3 will be about 450 mV, yet these resistors are required to pass the same current. If MP3 and MN3 are the same size as MP1 and MN1 respectively, then R3 would have to be about 4.5 times the resistance of R1. For best performance when using parasitic vertical transistors in a CMOS technology, QP1 and QP2 are best run at currents of a few micro amps. Also many applications have a severe power budget, and in such applications these resistors would tend to be tens of kilohms, and occupy substantial area. Introducing the 4:1 ratio of MN3 to MN1 makes R3 and R1 of similar value, which tends to be optimum for total resistor area.

Transistors MP2 and MP3 are preferably formed from multiple units, each similar to MP1 in layout. They preferably have a large channel length L for matching and high output impedance, but with a small channel width to length ratio W/L to keep Vgs-Vt large for good current matching.

Transistors MN2 and MN3 are similarly preferably multiples of the MN1 layout, and are also preferably large for good matching. However if Vgs-Vt is large, this will cause the consequent variation of Vgs (MN3) to attenuate the temperature coefficient of I(MN3) (essentially placing a resistance of 1/gm (MN3) in series with R3), so normally these transistors should be designed with a large enough W/L to give Vgs-Vt<100 mV, say, at the critical temperature. Then 1/gm (MN3) is about 10% of R3 and does not significantly degrade the temperature sensitivity of the circuit or introduce manufacturing sensitivity due to non-correlation of the resistor and MOS electrical characteristics.

Figure 3B:
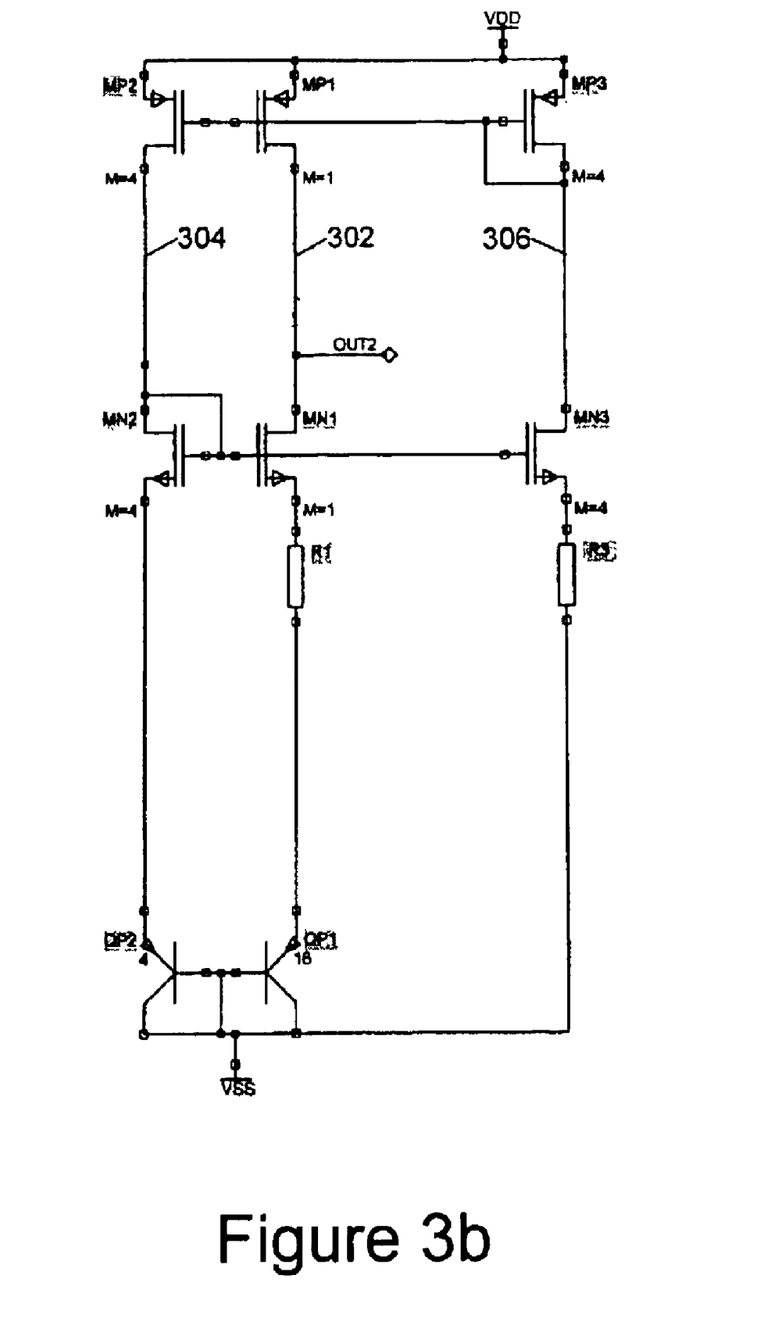

Reviewing the above description of the circuit operation it can be seen that the thermal voltage reference is "servoed" to the current mirror, this current mirror also driving the detection node. The base-emitter based reference uses one of the same transistors as the thermal voltage reference to provide a second, negative temperature coefficient output which is subtracted from the positive temperature coefficient thermal voltage based reference at the detection node. It will be appreciated that this arrangement could be swopped around so that the $V_{be}$-based reference is servoed to the current mirror (which mirror again drives the detection node) with the thermal voltage reference using the same transistor as the $V_{be}$-based reference and also driving the detection node. This alternative arrangement is shown in FIG. 3B where the gate-drain link on transistor MP1 has been moved to transistor MP3 and the output is taken from OUT2, line 302, that is the junction of transistors MP1 and MN1. The analysis and component values remain the same, at least to first order. The main difference is that the current consumed by the circuit now has a negative rather than a positive temperature coefficient.

Figure 3C:
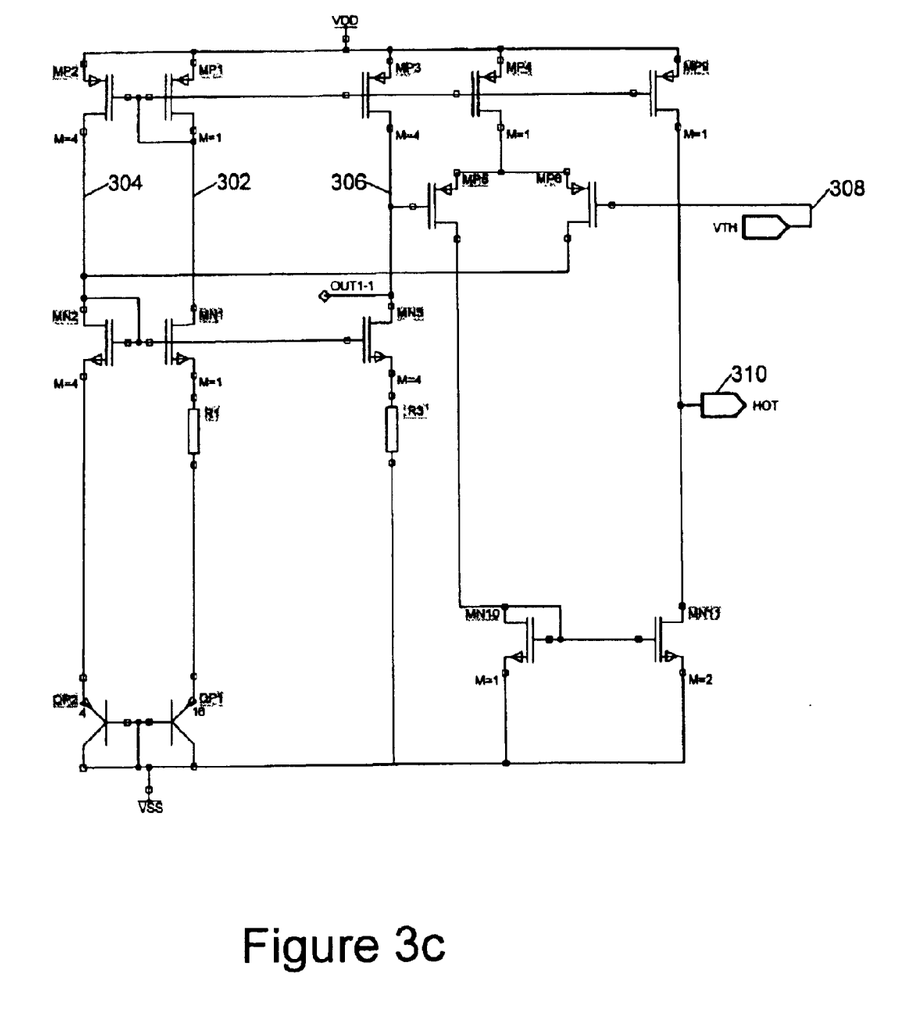

The circuit as so far described, which is without feedback, would tend to oscillate around a metastable state and positive feedback is therefore desired to provide hysteresis. FIG. 3c shows an extension of the circuit of FIG. 3A to implement this. MOS transistors MP4 and MP9 provide further outputs from the current mirror which are used as constant current sources. Line 306 is connected to an output transistor MP5 in a differential configuration with transistor MP6, connected to a common current source provided by transistor MP4, transistor MP6 providing positive feedback as described in more detail below. The gate of transistor MP6 is connected to a bias line 308 similar in voltage to the voltage source previously discussed on node 306, so that when the gates of MP5 and MP6 are at the same voltage, both MN3 and MP3 are in saturation, to avoid distortion of the temperature-dependent currents at or near the threshold temperature. Transistors MN10 and MN11 comprise a further current mirror and, in conjunction with transistor MP9, comprise an output circuit for driving an output line 310 substantially between supply rails $V_{DD}$ and $V_{SS}$ (or ground), for example for driving logic circuitry.

In the circuit of FIG. 3c positive feedback is provided by transistors MP4, 5 and 6. At cold temperatures node OUT1 will be low and hence transistor MP5 will be on and, noting the fixed sum of current (determined by MP4) through the channels of transistors MP5 and 6, transistor MP6 is turned off. As the temperature rises transistor MP5 starts to turn off and transistor MP6 begins to turn on, thus directing some current (from MP4) into transistors MN2 and QP2. This raises the voltage at the gate terminals of transistors MN2, MN1 and MN3 by ΔV. Ignoring for now any variation in Vgs of MN1 and MN3 and any variation in Vbe(QP1), this will increase the current through MOS transistor MN1 by a proportion ΔV/(I(R1).R1)=ΔV/(ΔVbe)=ΔV/101 mV, thus increasing the current through transistor MP1 and hence through MP3 thus further encouraging the rise in node OUT1. It will also increase the current through R3, but only by a smaller proportion, ΔV/(I(R3).R3)=ΔV/Vbe=ΔV/462 mV. (The rise in current I(R1) is not exactly ΔV/R1 because the additional feedback current upsets the 4:1 ratio of currents in MN2 and MN1 so that these transistors now have slightly different gate-source voltages, and the Vbes of QP1 and QP2 will also differ, but the overall effect is still that I(MP3) is increased much more than I(MN3).

This process continues until transistor MP5 is substantially completely turned off and transistor MP6 is carrying substantially the full current flowing through transistor MP4. At this point transistor MP4 effectively appears in parallel with transistor MP2, thus altering the ratio of the current mirror. Thus when the temperature eventually decreases the thermal trip point is lower in temperature than previously when the temperature was increasing, thus providing the desired hysteresis effect. It will be seen that the positive feedback does not directly set either the positive or the negative tempco reference current but instead alters a ratio of currents in the current mirror by adding to the output current from transistor MP2. This alters both the $V_{be}$-referenced and the thermal voltage referenced currents, but alters the thermal voltage referenced current more, thus, in effect, changing the balance of currents through transistors MN1 and MN3, and hence through transistors MP3 and MN3. Thus the feedback is not directly to the $V_{be}$-based referenced source or directly back to the output node OUT1 but is instead back to a shared node (line 304) and transistor (bipolar transistor (QP2). The drain current from QP5 is compared with the constant current through MP9 by mirror MN10, MN11 to give a rail-to-rail logic signal swing at line HOT.

Figure 3D:
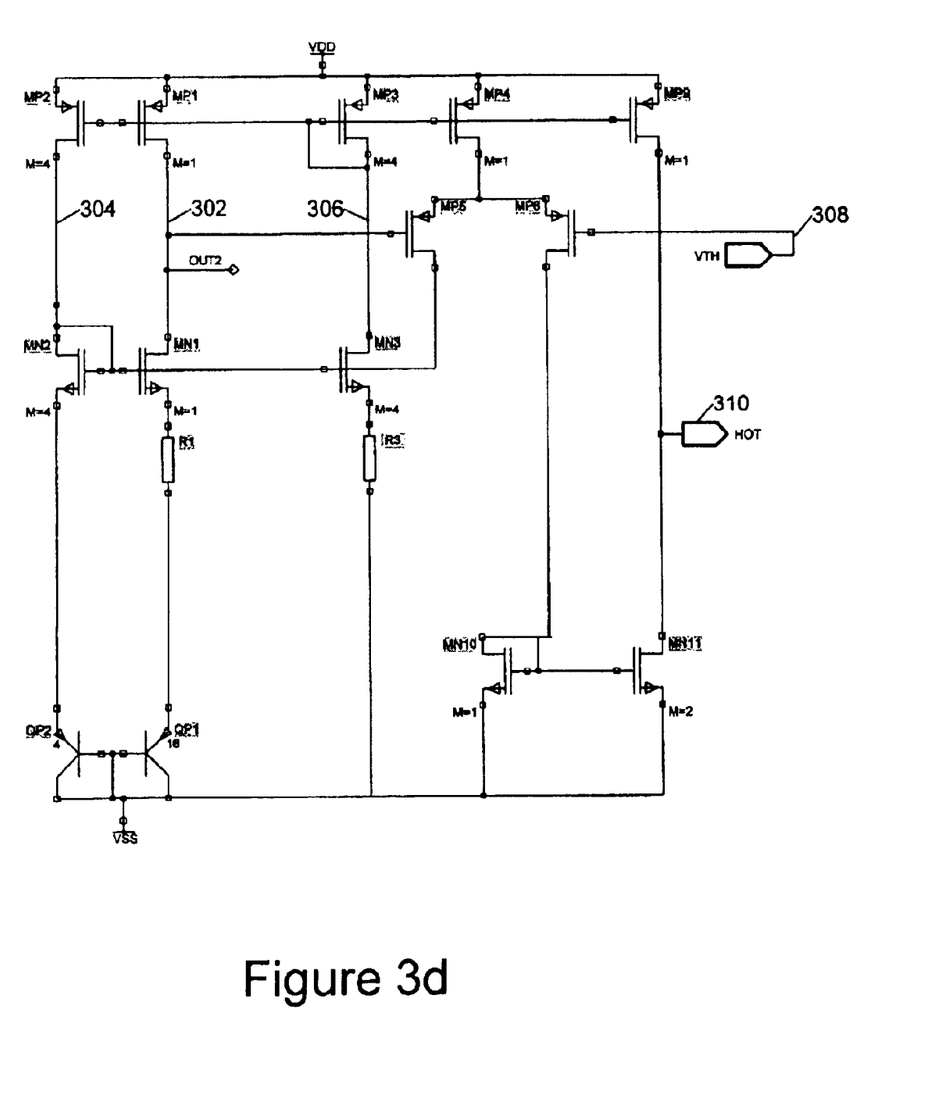

FIG. 3D shows a similar feedback scheme applied to circuit of FIG. 3B. Note that since the signal at the comparison node OUT2 goes low rather than high above the temperature threshold, it is the drain current of MP5 which is now fed into node (304) to provide positive feedback.

Figure 4:
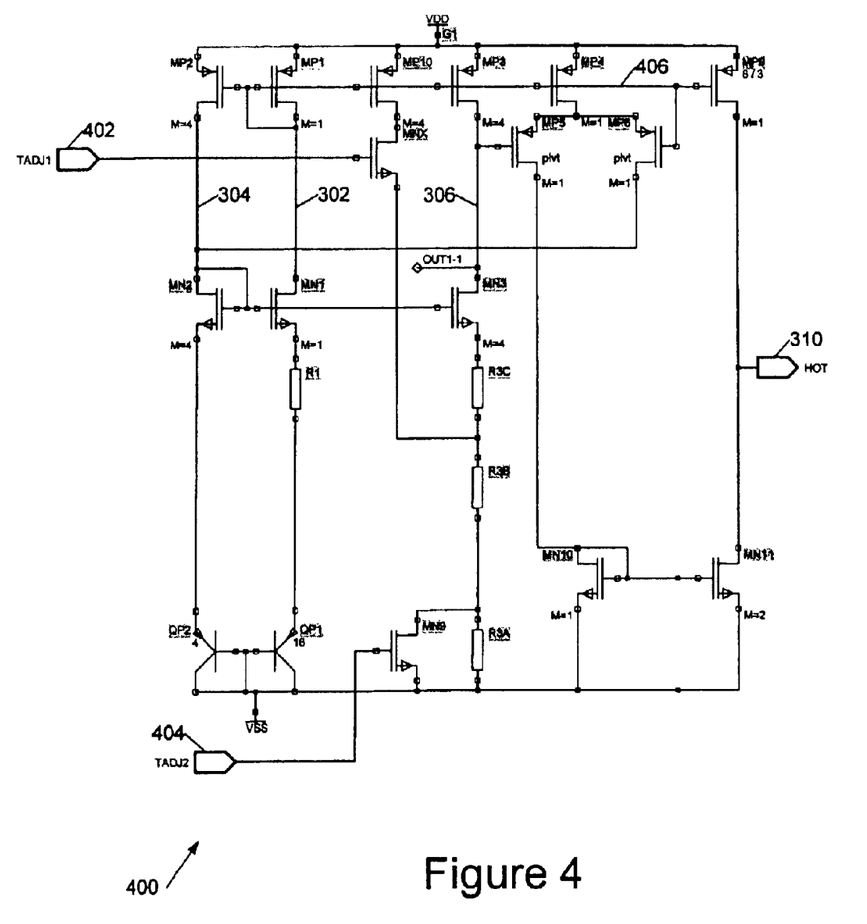
FIG. 4 shows a third embodiment of a temperature detector circuit according to the present invention.

Referring now to FIG. 4, this shows a further embodiment of a temperature detector 400 of the same basic type as that shown in FIG. 3c, and in which like reference numerals indicate like elements. In the circuit of FIG. 4 first 402 and second 404 temperature adjust lines are provided to permit external adjustment of the threshold temperature of the circuit.

Temperature adjust line 402 controls transistor MNX to inject a portion of positive temperature coefficient current from an additional output of the current mirror provided by transistor MP10, into the resistor chain R3A, B, C. This additional pull-up current decreases the threshold temperature.

Temperature adjust line 404 controls transistor MN9 to reduce the resistance of or short out a lower portion, R3A, of the resistor chain R3, which increases the $V_{be}$/R3 current and hence increases the threshold temperature.

The temperature adjust functions provided by lines 402 and 404 can be used to alter or modulate the temperature threshold, for example to provide an "early-warning" function or to allow the thermal trip circuitry to be exercised at room temperature when functionally testing manufactured parts.

As a point of detail, in FIG. 4 the gate of transistor MP6 is tied to the gates of the transistors in the current mirror. As stated above, the gate of MP6 should be biased to a suitable voltage to allow MP3 and MN3 to both be in saturation when MP5 and MP6 are balanced. Where, as in the illustrated embodiment, the process technology makes available optional "low-Vt" or reduced threshold voltage PMOS transistors the voltage on line 406 may be used to supply this bias, without forcing MP4 out of its saturation region. On a process without this option, the gate of MP6 may be connected to some other suitable point.

It will be appreciated that circuits such as those of FIGS. 2B and 2C have a second stable state, in which all transistors are off. Only a small initial current (for example, through transistor 236) is enough to take the circuit out of this state. This may often be supplied by junction leakage currents, or by capacitive currents on power-up, but a "start-up" circuit may be used to ensure that the circuit reliably leaves its zero-current state.

Figure 5:
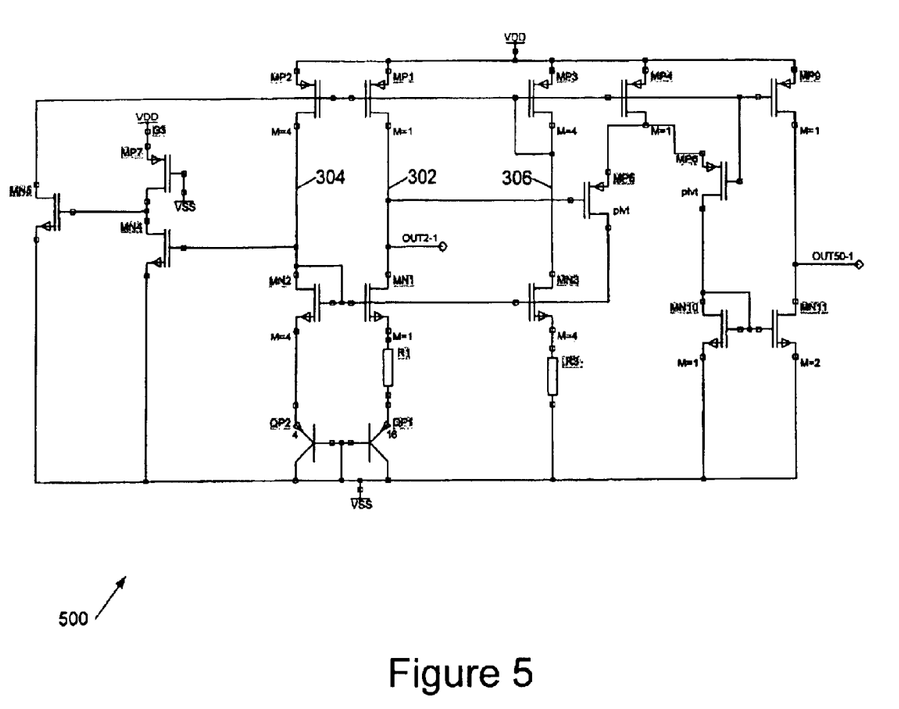
FIG. 5 shows a fourth embodiment of a temperature detector circuit according to the present invention.

FIG. 5 shows an embodiment 500 of a temperature detector circuit based upon the arrangement of FIG. 3D and incorporating such a start-up circuit. In FIG. 5 like elements to those of FIG. 3D are indicated by like reference numerals. In the circuit of FIG. 5 MN5 provides a small current to the PMOS mirror gates, with its gate voltage initially pulled up to Vdd by MP7. MN5 is turned off only once MN4 turns on, which only occurs when MN3, and hence MP3, has started to pass current. Similar techniques can be employed with the circuits of FIGS. 3c and 4. Other solutions will be readily apparent to skilled circuit design engineers.

No doubt many effective variants will occur to the skilled person. For example although the specific embodiment has been described with reference to PNP bipolar transistors the skilled person will readily appreciate that the circuit could be inverted and NPN bipolar transistors could be employed. Typically the vertical parasitic transistors on a CMOS process will be used, but parasitic lateral transistors (such as an MOS transistor with drain, bulk, and source acting as collector, base, and emitter respectively) or parasitic diodes (since the bipolar transistors are basically being used to provide diode junctions) could in principle be employed since the circuit is insensitive to the low betas typical of such transistors.

In other embodiments bipolar transistors QP1 and QP2 may be replaced by size ratioed MOS transistors. Preferably these MOS transistors are operated in subthreshold region, where they show a bipolar-like exponential I–V characteristic, but even when outside the subthreshold region, they will nonetheless provide a smaller but still positive temperature coefficient current.

It will be understood that the invention is not limited to the described embodiments and encompasses modifications apparently to those skilled in the art lying within the spirit and scope of the claims appended hereto.

I claim:

1. A temperature sensor comprising:
   a current mirror with an input and at least two outputs;
   a first reference current generator having a first current input and a first current output and configured to generate a first reference current with a positive temperature coefficient at said first current output in response to said first current input;
   a second reference current generator having a second current input and a second current output and configured to generate a second reference current with a negative temperature coefficient at said second current output in response to said second current input; and wherein
   one of said first and second reference generators has a respective current output coupled to said input of said current mirror;
   said first current input of said first reference generator and said second current input of said second reference generator share an input node coupled to a first of said current mirror outputs; and
   the other of said first and second reference generators has a respective current output coupled to a second of said current mirror outputs to thereby provide a current sense node; and wherein
   said first reference current generator comprises a thermal voltage referenced current source; and
   said second reference current generator comprises a temperature dependent semiconductor characteristic referenced current source.

2. A temperature sensor according to claim 1, wherein said first reference current generator comprises first and second transistors configured to operate at different current densities, said first transistor being coupled to said first current input and said second transistor being coupled to said first current output.

3. A temperature sensor as claimed in claim 2 wherein said second reference current generator comprises a transistor characteristic referenced current source.

4. A temperature sensor as claimed in claim 3 wherein said transistor characteristic to which said second current source is referenced comprises a characteristic of one of said first and second transistors of said first reference current generator.

5. A temperature sensor as claimed in claim 2 wherein said first and second transistors comprise MOS transistors.

6. A temperature sensor as claimed in claim 2 wherein said first and second transistors comprise bipolar transistors.

7. A temperature sensor as claimed in claim 1 wherein said temperature dependent semiconductor characteristic comprises a diode junction characteristic.

8. A temperature sensor as claimed in claim 7 wherein said second reference current generator comprises a bipolar transistor base-emitter voltage referenced current source.

9. A temperature sensor as claimed in claim 1, wherein said first reference current generator comprises first and second transistors configured to operate at different current densities, said first transistor being coupled to said first current input and said second transistor being coupled to said first current output; wherein said temperature dependent semiconductor characteristic comprises a diode junction characteristic; wherein said second reference current generator comprises a bipolar transistor base-emitter referenced current source; and wherein said base-emitter voltage reference of said base-emitter voltage referenced current source comprises a base-emitter voltage of said first transmitter.

10. A temperature sensor as claimed in claim 1 wherein said first and second reference current generators share a pair of series connected transistors coupled to said input node for generating both said first and second reference currents.

11. A temperature sensor as claimed in claim 1, fabricated in MOS technology.

12. A temperature sensor as claimed in claim 6, fabricated in CMOS technology, wherein said bipolar transistors comprise parasitic devices.

13. A temperature sensor as claimed in claim 8, fabricated in CMOS technology, wherein said bipolar transistors comprise parasitic devices.

14. A temperature sensor as claimed in claim 1 wherein said first reference current generator has said first current output coupled to said input of said current mirror.

15. A temperature sensor as claimed in claim 1, further comprising a temperature adjust circuit configured to alter current through said sense node to thereby alter a sensed temperature.

16. A temperature sensor as claimed in claim 1, further comprising a positive feedback circuit configured to inject current into said shared input node.

17. A temperature sensor as claimed in claim 16, wherein said positive feedback circuit comprises an output transistor coupled to said current sense node and a feedback transistor coupled to said shared input node, said output transistor and said feedback transistor being coupled to a common current source and configured such that as the current in one of said output and said feedback transistor increases the current in the other decreases.

18. A temperature sensor as claimed in claim 16, further comprising an output circuit coupled to said sense node to provide an output which switches at a threshold temperature, wherein said feedback circuit is configured to provide hysteresis for said switching.

19. A method of providing a temperature dependent signal, the method using:
a current mirror with an input and at least two outputs;
a first reference current generator having a first current input and a first current output;
a second reference current generator having a second current input and a second current output; and wherein one of said first and second reference generators has a respective current output coupled to said input of said current mirror;
said first current input of said first reference generator and said second current input of said second reference generator share an input node coupled to a first of said current mirror outputs; and
the other of said first and second reference generators has a respective current output coupled to a second of said current mirror outputs to thereby provide a current sense node;
the method comprising:
generating, using said first current generator, a first, transistor thermal voltage referenced current with a positive temperature coefficient at said first current output in response to a signal from said current mirror at said shared input node;
generating, using said second current generator, a second transistor voltage referenced current with a negative temperature coefficient at said second current output in response to said signal from said current mirror at said shared input node; and
combining signals dependent upon said first and second reference currents at said sense node to provide said temperature dependent signal.

20. A method as claimed in claim 19 wherein said first transistor thermal voltage referenced current is a bipolar transistor thermal voltage referenced current, and wherein said second transistor voltage referenced is a bipolar transistor base-emitter voltage referenced current.

21. A method as claimed in claim 19 wherein said first transistor thermal voltage referenced current is a MOS transistor thermal voltage referenced current, and wherein said second transistor voltage referenced current is a MOS threshold or gate-source voltage referenced current.

22. A temperature detection circuit comprising:
a current mirror having an input and first and second mirrored current outputs, said input and said first mirrored output being coupled via respective first and second MOS transistors channels to respective first and second MOS transistors to set a ratio of current densities in said first and second transistors to provide a positive temperature coefficient current from said second mirrored current output;
a third MOS transistor having a gate connection coupled to a gate connection of said first MOS transistor and a pair of channel connections, one of said channel connections being coupled via a resistor to a common connection of said first and second transistors to provide a negative temperature coefficient current output at said other channel connection whereby said current output is referenced to a temperature-dependent voltage of said first transistor, said other channel connection being coupled to said second mirrored current output to provide a temperature dependent output.

23. A temperature detection circuit as claimed in claim 22 wherein said first and second transistors comprise bipolar transistors, and wherein said temperature-dependent voltage of said first transistor comprises a base-emitter voltage of said first transistor.

24. A temperature detection circuit as claimed in claim 23, further comprising a feedback circuit to provide positive feedback to cause said temperature dependent output to exhibit bistable behavior with hysteresis.

25. A temperature detection circuit as claimed in claim 24, wherein said feedback circuit is configured effectively to adjust the ratio of said current mirror for said first mirrored output.

26. A temperature detection circuit as claimed in claim 22, further comprising a temperature adjuster effectively to adjust said negative temperature coefficient current output a said other channel connection.

27. A temperature detection circuit as claimed in claim 22, fabricated in CMOS technology, wherein said bipolar transistors comprise inherent parasitic transistors.

28. A temperature detection circuit comprising:
   a current mirror having an input and first and second mirrored current outputs, said second and first mirrored outputs being coupled via respective first and second MOS transistor channels to respective first and second MOS transistors;
   a third MOS transistor having a gate connection coupled to a gate connection of said first MOS transistor and a pair of channel connections, one of said channel connections begin coupled via a resistor to a common connection of said first and second transistors to provide a negative temperature coefficient current output at said other channel connection whereby said current output is referenced to a temperature-dependent voltage of said first transistor, said other channel connection being coupled to said current mirror input to provide negative temperature coefficient current from said second mirrored current output; and wherein
      a ratio of current densities in said first and second transistors determines a positive temperature coefficient current which is combined with said current from said second mirrored current output to provide a temperature dependent output.

29. A temperature detection circuit as claimed in claim 28 wherein said first and second transistors comprise bipolar transistors, and wherein said temperature-dependent voltage of said first transistor comprises a base-emitter voltage of said first transistors.

30. A temperature detection circuit as claimed in claim 29, further comprising a feedback circuit to provide positive feedback to cause said temperature dependent output to exhibit bistable behaviour with hysteresis.

31. A temperature detection circuit as claimed in claim 30, wherein said feedback circuit is configured effectively to adjust the ratio of said current mirror for said first mirrored output.

32. A temperature detection circuit as claimed in claim 28, further comprising a temperature adjuster effectively to adjust said negative temperature coefficient current output at said other channel connection.

33. A temperature detection circuit as claimed in claim 28, fabricated in CMOS technology, wherein said bipolar transistors comprise inherent parasitic transistors.

34. A method of generating a temperature dependent signal, the method comprising:
   generating a thermal voltage referenced positive temperature coefficient signal using a pair of transistors operating at different current densities;
   generating a transistor voltage referenced negative temperature coefficient signal, a temperature variation of said negative temperature coefficient signal being dependent upon a temperature variation of a transistor voltage of one of said pair of transistors; and
   subtracting one of said positive and negative temperature coefficient signals from the other of said signals to generate said temperature dependent signal, whereby the temperature dependence of said temperature dependent signal is greater than either of said subtracted signals.

35. A method as claimed in claim 34 wherein said pair of transistors comprises a pair of bipolar transistors and wherein said transistor voltage comprises a base-emitter voltage.

36. A method as claimed in claim 34, wherein said positive and negative temperature coefficient signals comprise current signals.

37. A method as claimed in claim 36, wherein said subtracting comprises applying said positive and negative temperature coefficient signals to a detection node.

38. A method as claimed in claim 34, further comprising applying positive feedback to the transistor of said pair also used for generating said negative temperature coefficient signal.

39. A method as claimed in claim 34, further comprising adjusting said temperature dependent signal by adjusting said negative temperature coefficient signal.

40. A method as claimed in claim 34 wherein said pair of transistors is configured such that four terminals of the transistors, two of each transistor of the pair, are connected together.

41. A circuit for generating a temperature dependent signal the circuit comprising:
   means for generating a thermal voltage referenced positive temperature coefficient signal using a pair of transistors operating at different current densities;
   means for generating a transistor voltage referenced negative temperature coefficient signal, a temperature variation of said negative temperature coefficient signal being dependent upon a temperature variation of a transistor voltage of one of said pair of transistors; and
   means for subtracting one of said positive and negative coefficient signals from the other of said signals to generate said temperature dependent signal, whereby the temperature dependence of said temperature dependent signal is greater than either of said subtracted signals.

42. A circuit as claimed in claim 41 wherein said transistors comprise bipolar transistors, and wherein said transistor voltage comprises a base-emitter voltage.

43. A circuit as claimed in claim 41 wherein said transistors comprise MOS transistors, and wherein said transistor voltage comprises a MOS transistor threshold or gate-source voltage.

44. A circuit as claimed in claim 41 wherein said pair of transistors is configured such that four terminals of the transistors, two of each transistor of the pair, are connected together.

45. A circuit as claimed in claim 41 further comprising a positive feedback circuit configured to inject current into a common input node of said positive and negative temperature coefficient signal generation means.

* * * * *